May 23, 1944.   D. W. DORRANCE   2,349,411
ARTIFICIAL ARM JOINT
Filed April 16, 1942
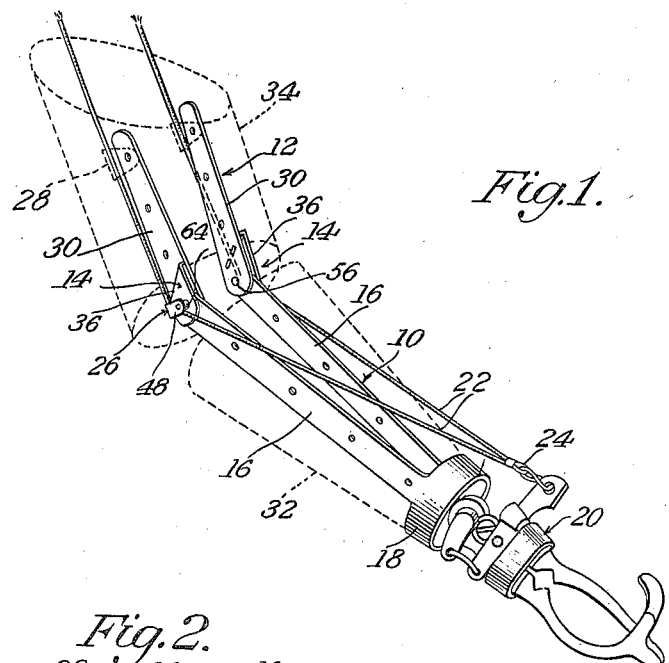
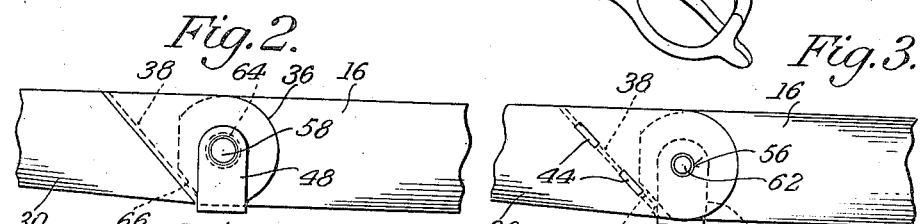
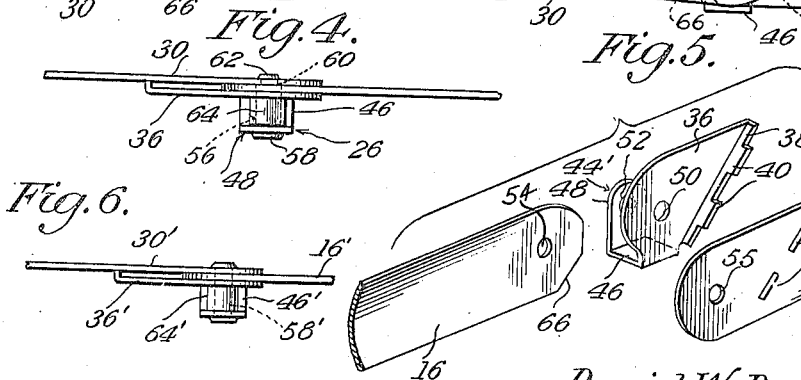
INVENTOR.
David W. Dorrance
BY
Victor J. Evans & Co.
ATTORNEYS Patented May 23, 1944

2,349,411

UNITED STATES PATENT OFFICE 2,349,411

ARTIFICIAL ARM JOINT

David W. Dorrance, San Jose, Calif.; May Belle Dorrance executrix of said David W. Dorrance, deceased Application April 16, 1942, Serial No. 439,272

3 Claims. (Cl. 3—12)

My invention relates to artificial limbs, and has among its objects and advantages the provision of an improved upper arm joint.

In the accompanying drawing:

Figure 1 is a perspective view illustrating the arm joint;

Figure 2 is an elevational view of a pivot structure;

Figure 3 is a similar view of the inner side of the pivot structure;

Figure 4 is a plan view of the pivot structure of Figure 2;

Figure 5 is a perspective view illustrating the parts of the pivot structure separated one from the other for the purpose of illustration; and Figure 6 is a detail view of a modified pivot.

In the embodiment selected to illustrate the invention, I make use of a metallic frame comprising a forearm section 10 and a brachium section 12. These sections are pivotally connected through the medium of joints 14, the joints being duplicates. Section 10 comprises two straps 16 arranged in converging relationship for connection with a socket 18 to which the hand appliance or hook 20 is connected. The hook is manipulated through the medium of pull lines 22 which comprise a single line having its ends connected at 24 and is of such length as to loop about the shoulder of the other arm to the end that the hand appliance may be manipulated through a shrug of that shoulder.

The pull lines are threaded through guides or eyelets 26 coaxial with the axes of the joints 14 which constitute the elbow joint. These lines are also threaded through sleeve-like guides 28 secured to the upper ends of the two straps 30 which make up the section 12. The straps 16 may be riveted or otherwise secured to a leather socket 32, which is also true of the straps 30 with respect to the socket 34.

Figures 2 through 5 illustrate the specific construction of one of the joints 14. The strap 16 has one end positioned between a lip 36 and the strap 30, the lip being anchored to the strap 30. In Figure 5, the lip 36 is provided with a right angular flange 38 provided with two lugs 40. Two slots 42 are provided in the straps 30 for the reception of the lugs 40, the lugs being riveted, as at 44 in Figure 3, to fixedly secure the lip 36 with the flange 38 having edge engagement with the strap 30.

An extension 44' is formed integrally with the lip 36 and is bent to provide a short portion 46 extending at right angles from the lip 36 and a portion 48 which parallels the lip but spaced therefrom. The lip 36 and the portion 48 are provided with coaxial openings 50 and 52, respectively. An opening 54 is provided near one end of the strap 16, and this end is positioned between the lip 36 and the portion 48, with a rivet 56 extended through the openings 50, 52 and 54 as well as an opening 55 in the strap 30, for pivotally connecting the two straps 16 and 30.

In Figure 4, the rivet 56 has a head 58 engaging the outer face of the portion 48, and the rivet is formed with a small diameter shank 60, which constitutes the length of the rivet extending through the opening 54 in the strap 16. This shank is riveted at 62 for making the rivet 56 secure. Upon the extent of the rivet between the portion 48 and the lip 36 is mounted a sleeve roller 64 spaced slightly from the portion 46, with one of the pull lines 22 extending between the roller sleeve 64 and the portion 46.

In view of the fact that the larger diameter of the rivet 56 engages the inner face of the strap 30, the distance between the lip 36 and the portion 48 remains unaltered notwithstanding upsetting of the shank 60, as at 62. Thus the ends of the sleeve roller 64 may be fitted closely to the respective lip 36 and the extension 48 without binding, in addition to providing a sufficiently close fit to prevent the pull line 22 from being wedged between the ends of the sleeve roller and the lip or the portion 48.

It will thus be seen that the sleeve roller 64 is positioned coaxially with the axes of the joints 14. Since the sleeve roller is of relatively small diameter, the arm frame comprising the sections 10 and 12 may be bent freely without obstruction from the pull lines 22 and without unintentional actuation of the hand appliance, with the pivotal action consummated without appreciably exerting a pull on or imparting slack to the pull lines. In addition, the pull lines are housed between the respective sleeve rollers and the extension 44 so as to be effectively maintained in assembled relationship with the joints.

The sections 10 and 12 are formed of relatively thin strap material, and the sleeve rollers 64 are of relatively short lengths to provide a joint structure which is devoid of objectionable bulk. This feature eliminates excessive wear on clothing, which is characteristic of the more bulky joint structures.

Each strap 16 is provided with a diagonal edge 66 arranged to abut its respective flange 38 when the respective straps 16 and 30 are brought into axial alignment. When the joint is bent to its maximum limit, the edges of the straps 16 engage the flanges 38, so that stops are provided for limiting the pivotal action. Thus the sections 10 and 12 may be pivoted freely throughout an arc of 130° but are restrained from relative pivotal movement beyond this range. The straps 16 are preferably curved transversely in conformity with the contour of the socket 32, with the exception of the margins which are fitted between the respective lips 36 and the straps 30.

Figure 6 illustrates a pivot structure wherein the rivet 58' is of uniform diameter and in which the sleeve 64' functions as a spacer only. In all other respects this pivot structure is identical with the pivot structure of Figures 1 through 5, so that the accented reference numerals identify corresponding parts. A structure according to Figure 6 eliminates the necessity of a two-diameter rivet and the sleeve 64' facilitates riveting when such a rivet is employed. The parts are riveted together sufficiently tight to hold the parts together but not to cause objectionable binding between the relatively movable parts.

Without further elaboration, the foregoing will so fully illustrate my invention, that others may, by applying current knowledge, readily adapt the same for use under various conditions of service.

I claim:

1. An artificial arm joint comprising a forearm section, a brachium section comprising two rigid straps, said forearm section comprising two rigid straps attached to a socket adapted for connection with a hand appliance, each strap of the forearm section having an end margin overlapping an end margin of one strap of the brachium section, lips riveted to the end margins of the straps of the brachium section and spaced therefrom to receive the end margins of the straps of the forearm section therebetween, extensions formed integrally with said lips and bent to provide portions paralleling but spaced from the lips, rivets extending through the respective overlapping end margins, said lips and said portions to pivotally connect the brachium section with the forearm section, said rivets and said extensions being coactive to provide eyelets for pull lines of the hand appliance, sleeve rollers on said rivets between said portions and their respective lips for said pull lines, said lips having flanges engaging the respective straps of the brachium section, and end formations on the straps of the forearm section engageable with said flanges to restrain relative pivotal movement of the brachium section and the forearm section beyond a predetermined limit.

2. An artificial arm joint comprising a forearm section, a brachium section comprising two rigid straps, said forearm section comprising two rigid straps attached to a socket adapted for connection with a hand appliance, each strap of the forearm section having an end margin overlapping an end margin of one strap of the brachium section, lips riveted to the end margins of the straps of the brachium section and spaced therefrom to receive end margins of the straps of the forearm section therebetween, extensions formed integrally with said lips and bent to provide portions paralleling but spaced from the lips, rivets extending through the respective overlapping end margins, said lips and said portions to pivotally connect the brachium section with the forearm section, sleeve spacers mounted on said rivets between said portions and their respective lips, said rivets and said extensions coacting to provide eyelets for pull lines of the hand appliance, said lips having flanges engaging the respective straps of the brachium section; and end formations on the straps of the forearm section engageable with said flanges to restrain relative pivotal movement of the brachium section and the forearm section beyond a predetermined limit in one direction.

3. An artificial arm comprising forearm and brachium sections each embodying rigid straps extending longitudinally thereof, plates arranged in spaced parallel relation to the lower end portions of the brachium straps, said plates being provided at their upper ends with flanges extending therefrom in the direction of the brachium straps and secured to said straps, the upper end portions of the forearm straps being located between the said plates and the lower end portions of the brachium straps, and pivots extending through the plates and said end portions of the straps, the upper ends of the forearm straps being inclined and cooperating with the flanges of the plates to limit the swinging movement of the forearm section with relation to the brachium section in one direction.

DAVID W. DORRANCE.